United States Patent
Toshikawa et al.

(10) Patent No.: US 6,690,529 B1
(45) Date of Patent: Feb. 10, 2004

(54) DISK STORAGE DEVICE AND PARAMETER TRANSFER METHOD

(75) Inventors: Kiyohide Toshikawa, Kawasaki (JP); Yuichiro Yamazaki, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 474 days.

(21) Appl. No.: 09/723,769

(22) Filed: Nov. 28, 2000

(30) Foreign Application Priority Data

Jan. 7, 2000 (JP) ........................................ 2000-001249

(51) Int. Cl.$^7$ .......................... G11B 15/18; G11B 17/00; G11B 19/02
(52) U.S. Cl. ........................................ 360/69; 360/78.07
(58) Field of Search ........................ 360/75, 78.01, 360/78.04, 78.07, 69, 61

(56) References Cited

U.S. PATENT DOCUMENTS

| | | | | |
|---|---|---|---|---|
| 5,075,805 A | * | 12/1991 | Peddle et al. | .................. 360/61 |
| 5,557,482 A | * | 9/1996 | Christensen et al. | ........... 360/53 |
| 5,642,244 A | * | 6/1997 | Okada et al. | .................. 360/61 |
| 5,966,263 A | * | 10/1999 | Freitas et al. | ................... 360/69 |
| 6,078,453 A | * | 6/2000 | Dziallo et al. | ................. 360/55 |
| 2003/0133215 A1 | * | 7/2003 | Kitagawa | ...................... 360/61 |

FOREIGN PATENT DOCUMENTS

| | | |
|---|---|---|
| JP | 06290543 A | 10/1994 |
| JP | 07161137 A | 6/1995 |
| JP | 09063198 A | 3/1997 |
| JP | 09180373 A | 7/1997 |

* cited by examiner

*Primary Examiner*—David Hudspeth
*Assistant Examiner*—Jason Olson
(74) *Attorney, Agent, or Firm*—Greer, Burns & Crain, Ltd.

(57) ABSTRACT

A hard disk controller (HDC) receives a request an operation to retrieve, read, or write data using a magnetic disk. An MPU determines the contents of the received request, and transfers to an IC such as a head IC (HDIC), a PRML read channel process (RDC), a servo-demodulator (SV-DEMO), etc. set values of minimal parameters to control the parameters whose settings are to be changed to control the operations of a storage device to perform the processes for the request.

12 Claims, 12 Drawing Sheets

| OPERATION | HEAD/CYLINDER | OPERATION MODE | TRANSFER PARAMETERS |
|---|---|---|---|
| SEEKING | DIFFERENT HEAD/CYLINDER NOT MOVED | (1) | HS, IMR, SSLE, SSLD, SBT, SFC |
| | SAME HEAD/CYLINDER MOVED | (2) | SSLE, SSLD, SBT, SFC, SFG |
| | DIFFERENT HEAD/CYLINDER MOVED | (3) | HS, IMR, SSLE, SSLD, SBT, SFC, SFG |
| READING | DIFFERENT HEAD/CYLINDER NOT MOVED | (4) | HS, IMR, SSLE, SSLD, SBT, SFC, FIR, FC, Boost |
| | SAME HEAD/CYLINDER MOVED | (5) | SSLE, SSLD, SBT, SFC, SFG, FIR, FC, Boost, TBG |
| | DIFFERENT HEAD/CYLINDER MOVED | (6) | HS, IMR, SSLE, SSLD, SBT, SFC, SFG, FIR, FC, Boost, TBG |
| WRITING | DIFFERENT HEAD/CYLINDER NOT MOVED | (7) | HS, IMR, SSLE, SSLD, SBT, SFC, IW |
| | SAME HEAD/CYLINDER MOVED | (8) | SSLE, SSLD, SBT, SFC, SFG, TBG |
| | DIFFERENT HEAD/CYLINDER MOVED | (9) | HS, IMR, SSLE, SSLD, SBT, SFC, SFG, IW, TBG |

|  | HDIC | RDC | SV-demo |
|---|---|---|---|
| (i) PARAMETERS TO BE REWRITTEN ONLY WHEN POWER IS ON | HBW, LBW, TADT | R_MODE W_MODE | AGI |
| (ii) PARAMETERS TRANSMITTED WHEN OPERATION MODE IS SWITCHED | HS, IMR, IW | FIR, FC, Boost TBG | SSLE, SSLD, SFC, SBT, SFG |

FIG. 1     PRIOR ART

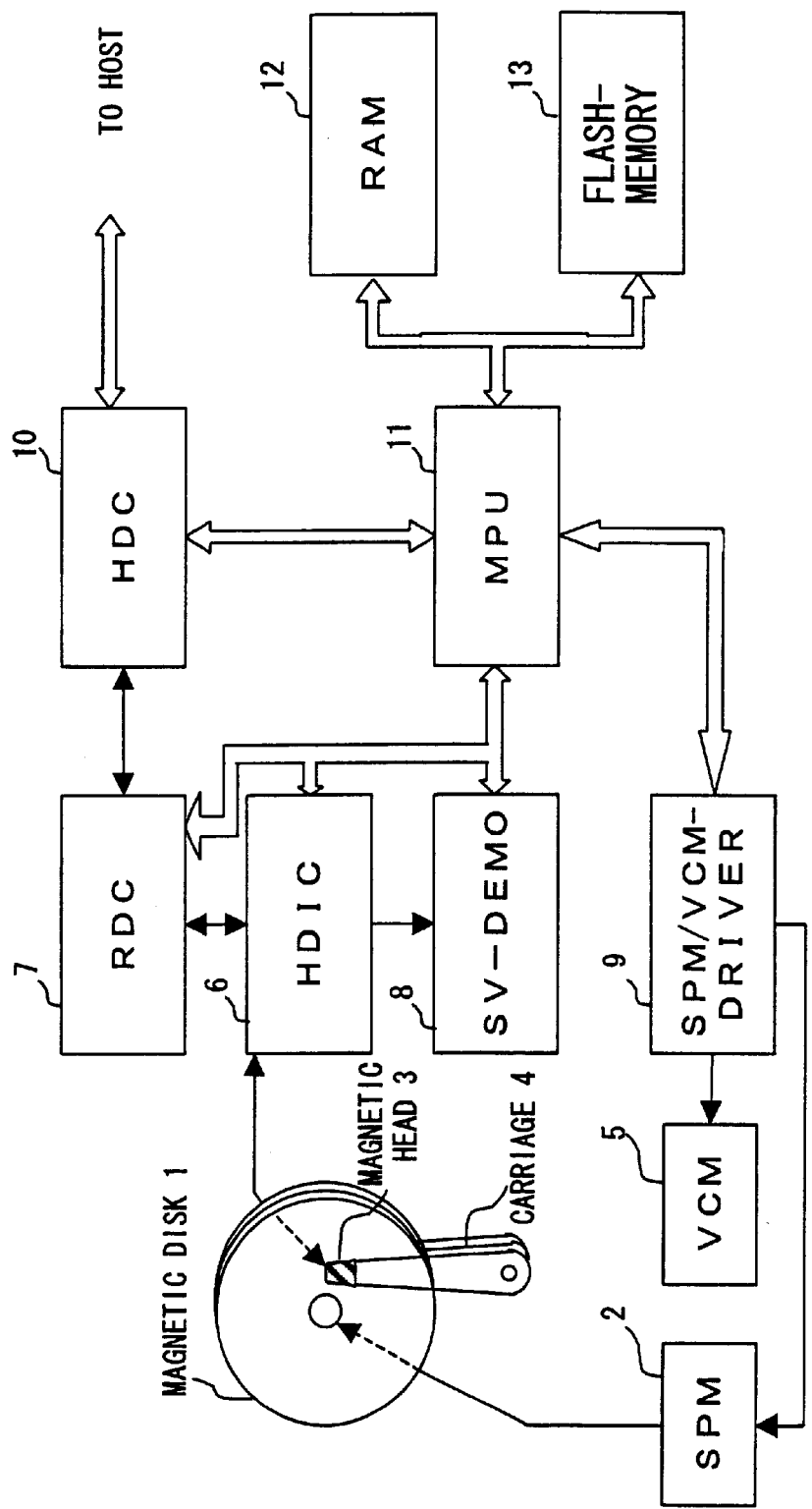
F I G. 4

| OPERATING | TRANSFER PARAMETER |
|---|---|
| SEEKING | HS, IMR, SSLE, SSLD, SBT, SFC, SFG |
| READING | FIR, FC, Boost, TBG |
| WRITING | IW, TBG |

F I G. 5

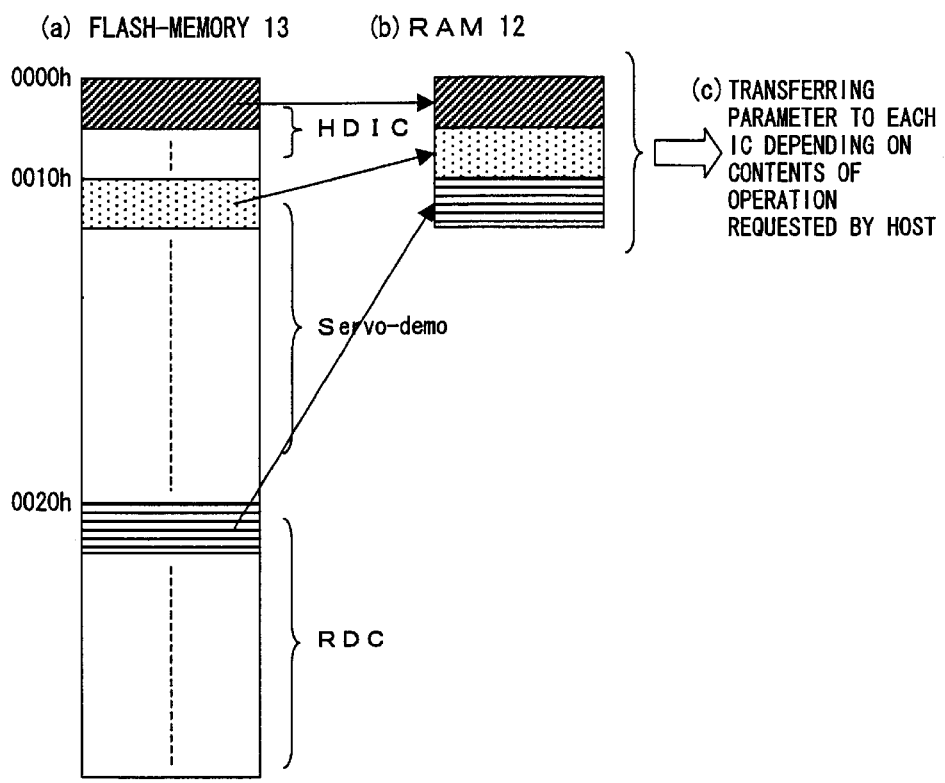
F I G. 7

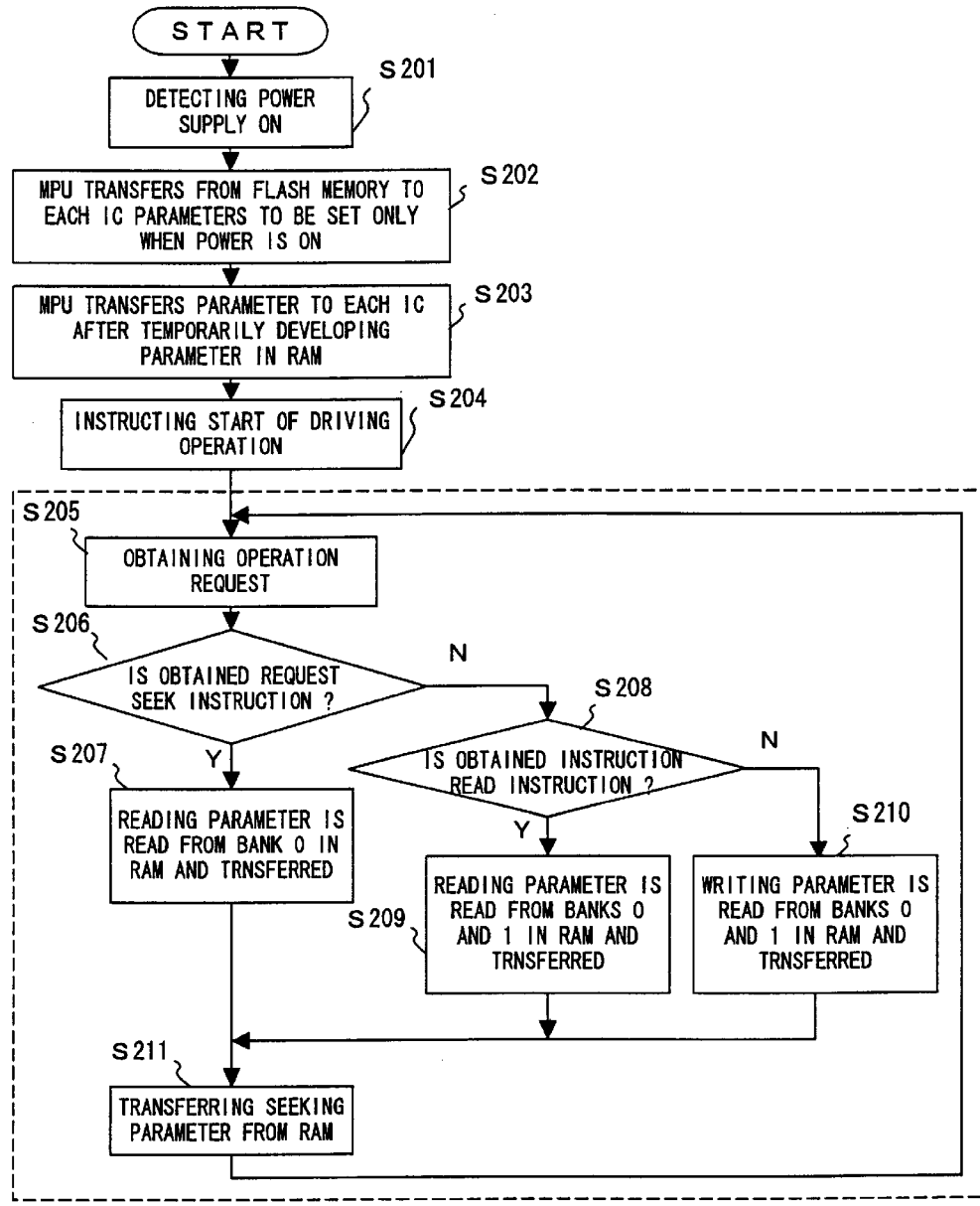
F I G. 9

| OPERATION | | HEAD/CYLINDER | OPERATION MODE | TRANSFER PARAMETERS |
|---|---|---|---|---|
| SEEKING | | DIFFERENT HEAD/CYLINDER NOT MOVED | (1) | HS, IMR, SSLE, SSLD, SBT, SFC |
| | | SAME HEAD/CYLINDER MOVED | (2) | SSLE, SSLD, SBT, SFC, SFG |
| | | DIFFERENT HEAD/CYLINDER MOVED | (3) | HS, IMR, SSLE, SSLD, SBT, SFC, SFG |
| READING | | DIFFERENT HEAD/CYLINDER NOT MOVED | (4) | HS, IMR, SSLE, SSLD, SBT, SFC, FIR, FC, Boost |
| | | SAME HEAD/CYLINDER MOVED | (5) | SSLE, SSLD, SBT, SFC, SFG, FIR, FC, Boost, TBG |
| | | DIFFERENT HEAD/CYLINDER MOVED | (6) | HS, IMR, SSLE, SSLD, SBT, SFC, SFG, FIR, FC, Boost, TBG |
| WRITING | | DIFFERENT HEAD/CYLINDER NOT MOVED | (7) | HS, IMR, SSLE, SSLD, SBT, SFC, IW |
| | | SAME HEAD/CYLINDER MOVED | (8) | SSLE, SSLD, SBT, SFC, SFG, TBG |
| | | DIFFERENT HEAD/CYLINDER MOVED | (9) | HS, IMR, SSLE, SSLD, SBT, SFC, SFG, IW, TBG |

F I G. 1 0

DISK STORAGE DEVICE AND PARAMETER TRANSFER METHOD

BACKGROUND OF THE INVENTION

1. Field of the Invention

The present invention relates to a technology realized with a storage device using a disk-shaped (circular) storage medium, and more specifically to a technology of setting various parameters for control of seeking, reading and writing data using a head in each unit of the device for the storage medium.

2. Description of the Prior Art

For example, a storage device using a disk-shaped storage medium such as a magnetic disk and an optical disk, etc. has a large storage capacity, accesses data at a high speed, and the cost per storage capacity is relatively low. Therefore, it is widely used in computers, etc. Described below is a magnetic disk storage device as an example of the above mentioned storage device.

A magnetic disk storage device is configured using various IC (integrated circuits). Each IC receives various parameters transferred from an MPU (microprocessor) for controlling the entire system, and each IC functions depending on the settings of the parameters, thereby writing/reading data to and from a magnetic disk.

Recently, various ICs configuring a magnetic disk storage device have been provided with a variety of functions in response to a request to realize a high-performance device and guarantee high reliability. As a result, it is necessary to set a large number of parameters in the ICs to operate the ICs.

Some of these parameters have to be transferred only once when the power is applied to a magnetic disk storage device, and no subsequent transfer is required, and others have to be transferred each time a process is performed with an operation mode switched into a different mode among a data seek (retrieval) mode, a data read mode, and a data write mode.

FIG. 1 is a table of important parameters transmitted from an MPU for each IC of important ICs HDIC, RDC, and SV-DEM forming part of a magnetic disk storage device. The table shown in FIG. 1 contains (i) parameters to be transferred only when the power is applied to a magnetic disk storage device, and (ii) parameters to be transferred each time a process is performed with an operation mode switched into another. Described below are these ICs and parameters set for the ICs.

The HDIC is a head IC, and controls the operations of a magnetic head. The IC practically functions as a preamplifier for amplification of a read signal and a bias current source for a magnetic head when data is read, and as a driver of the magnetic head when data is written. Furthermore, the HDIC has the function of selecting a magnetic head for use actually in writing/reading data from a plurality of magnetic heads.

The HDIC has parameters HBW, LBW, and TADT to be transferred when the power is applied to the system, and parameters HS, IMR, and IW to be transferred when an operation mode is switched into another.

For the parameters HBW and LBW, the upper limit and the lower limit of the passage area of a band pass filter are set to limit the band of a signal read from each magnetic head.

The TADT is a parameter set to solve the problem (thermal asperity) that a resistance value is changed by the influence of the heat generated by the contact between a magnetic head and a magnetic disk when an MR (magneto resistive) element is used as the magnetic head. A threshold is set to detect that a magnetic head touches a magnetic disk based on the voltage value obtained from the magnetic head.

The HS is short for head selection, and is a parameter set to select a head to be used in a newly switched operation mode from a plurality of magnetic heads.

The IMR refers to a sense current for which a bias current value for the selected head is set when data is read.

The IW refers to a write current for which a drive current value for the selected magnetic head is set when data is written.

The RDC refers to an IC of a read channel. The IC is used in a data signal process. When data is read, a data signal, which is an analog signal transmitted from the HDIC, is demodulated based on, for example, the PRML (partial response maximum likelihood) system, and is then decoded. The decoded digital data is converted into a parallel signal. When data is written, the data to be written is encoded and modulated. A data signal, which is an analog signal, is transmitted to the HDIC.

The RDC has parameters R_MODE and W_MODE to be transferred when power is applied to the system, and parameters FIR, FC, Boost, and TBG to be transferred when operation modes are switched.

For the R_MODE, a decoding system is set when data is read.

For the W_MODE, an encoding system is set when data is written.

For the FIR, the number of taps of a digital filter functioning as an equalizer for signal equivalence is set, thereby setting the characteristic of the digital filter.

For the FC and Boost, the cutoff frequency and the amount of boost of an analog filter (high cut or high boost) for limiting the band of an analog signal are respectively set, thereby setting the characteristics of the analog filter.

For the TBG, the frequency to be generated by a time base generator for generating a reference clock for the RDC, that is, the transfer frequency between a magnetic head and a magnetic disk, is set. It is necessary to change the parameter each time an operation mode is switched when data is stored on a magnetic disk using a ZBR (zone bit recording), etc.

An SV-DEMO is an IC of a servo demodulator, and practically processes a signal required to configure the servo for control of the position of a magnetic head according to a data signal which is an analog signal transmitted from the HDIC.

The SV-DEMO has a parameter AGI to be transferred when power is applied to the system, and parameters SSLE, SSLD, SFC, SBT, and SFG to be transferred when operation modes are switched.

For the AGI, an output level of an AGC (automatic gain control) amplifier for amplifying an analog signal is set.

For the SSLE and SSLD, a threshold of the determination condition of 3-value determination performed when a waveform is equalized by the partial response system is set.

For the SFC and SBT, the cutoff frequency and the amount of boost of the filter (high cut or high boost) for determination of the stability and the response time are respectively set, thereby setting the characteristics of the filter.

For the SFG, a frequency generated by a time base generator of the SV-DEMO, that is, the transfer frequency of the data between a magnetic head and a magnetic disk is set. It is also necessary to change this parameter each time operation modes are switched when data is stored on a magnetic disk using the ZBR, etc.

FIG. 2 is a flowchart of the contents of the parameter transferring process performed by the MPU of the conventional magnetic disk storage device.

First, in S1001, the MPU detects that power has been applied to the magnetic disk storage device.

Then, in S1002, the MPU reads the set value of a parameter (for example, the parameter shown in line (i) in FIG. 1) to be rewritten only when power is turned ON from the flash memory (or ROM) storing in advance the set value of each parameter, and transfers the value to a corresponding IC.

In S1003, the MPU reads a parameter (for example, a parameter shown in line (ii) in FIG. 1) to be transferred when operation modes are switched from the flash memory (or ROM), and temporarily stores the parameter in the RAM used by the MPU as work memory. FIG. 3 shows an example of assigning a storage area of the RAM on which the parameter transferred when operation modes are switched is stored, and the set values of the parameters are stored for each IC requiring the setting of the value in the storage area. Then, the MPU reads the initially set value of each parameter, and transfers it to each IC.

In S1004, the MPU instructs each IC to start operating the magnetic disk storage device.

In S1005, the MPU obtains a request for seeking, reading, and writing operations from the system of a computer, etc. which is a host of the magnetic disk storage device.

In S1006, the MPU selects a parameter (for example, a parameter shown in (ii) in FIG. 1) set when operation modes are switched, reads the set value of each of the selected parameters, and transfers it to each IC.

In S1007, the MPU specifies each IC to start an operation at a request obtained in S1005, and then returns back in S1005, and repeats the above mentioned processes.

The MPU in the conventional magnetic disk storage device has realized the transfer of each parameter to each IC by performing the above mentioned processes.

As described above, as various ICs forming a magnetic disk storage device have been assigned a larger number of functions, it is necessary to set a larger number of parameters to operate all these ICs. However, in the process performed by the MPU of the conventional magnetic disk storage device of transferring to each IC a parameter value to be set each time operation modes are switched, the set values of all corresponding parameters are transferred to respective ICs regardless of the difference in contents of the operation requests from the host. Therefore, with an increasing number of parameters, the transfer time of parameter values exceedingly increases, thereby undesirably affecting the response time for an operation request to the magnetic disk storage device.

SUMMARY OF THE INVENTION

The present invention has been developed to solve the above mentioned problems, and aims at shortening the response time for an operation request in a storage device using a disk-shaped storage medium.

The disk storage device according to an embodiment of the present invention is based on the disk storage device for seeking, reading, or writing data on a disk-shaped information storage medium using a head.

The disk storage device includes an obtaining unit for obtaining a request for the operation; a determination unit for determining the contents of the request; and a transfer unit for transferring the set value of the parameter, among the parameters for control of the operation, to be changed such that the request for the operation can be satisfied.

With the configuration, depending on the contents of the operation request issued by the host, only the set value of the minimal parameter is transferred to control the operation such that the contents of the request can be satisfied, and the set value of a parameter unnecessary for the control is prevented from being transferred. As a result, the response time to the host for the operation request can be shortened.

With the configuration, the device can further include memory whose storage area includes a plurality of banks for dividing the set values of the parameters corresponding to the contents of the operation request and storing the divided values in the respective banks. The transfer unit can read the set value of the parameter, and transfer it. With the configuration, a data accessing process repeatedly performed on the memory when a parameter set value is read can be performed at a high speed. Therefore, the response time of the disk storage device to the host can be furthermore shortened.

Furthermore, a method of transferring a control parameter according to another embodiment of the present invention is based on the method of transferring a parameter for control of an operation of the disk storage device for performing head seeking, data reading, or data writing operations on a disk-shaped storage medium. The method includes: obtaining a request for the operation; determining the contents of the request; and transferring the set value of the parameter, among the parameters for control of the operation, to be changed such that the request for the operation can be satisfied. Thus, according to this control parameter transferring method, the operation and effect similar to those of the above mentioned disk storage device can be obtained.

With the configuration of the disk storage device according to the present invention, the device can further include a plurality of heads for reading and writing data using the storage medium, and the transfer unit, and the transfer unit can be designed not to transfer a set value of a parameter for control of a selecting process when it is not necessary to change the selection of the head to control the above mentioned operation. Otherwise, the device can further include a head for reading and writing data using the information storage medium, and the transfer unit can be designed not to transfer a set value of a parameter for setting a transfer frequency of data between the head and the storage medium when it is not necessary to change the position of the head on the storage medium to control the above mentioned operation. Among the parameters required to control a requesting operation, some parameters require no change of settings depending on the operation status of the current disk storage device. With the configuration, the transfer of the set value of such a parameter can be suppressed. Therefore, the number of parameters for transfer of set values can be reduced, thereby furthermore shortening the response time from the disk storage device to the host.

In addition, a computer-readable program storage medium storing a control parameter transfer program for directing a computer to perform a controlling process corresponding to the above mentioned method of transferring a control parameter can be designed to direct the computer to read and execute the program. With the configuration, the operation and effect similar to those of the above mentioned disk storage device can be obtained.

BRIEF DESCRIPTION OF THE DRAWINGS

The present invention will be more apparent from the following detailed description when the accompanying drawings are referenced.

FIG. 1 is a table of ICs forming the magnetic disk storage device and parameters necessary to be set in the ICs;

FIG. 4 shows the configuration of the magnetic disk storage device embodying the present invention;

FIG. 5 is a table showing the relationship between the operation performed using a magnetic disk and the necessary parameter for the operation;

FIG. 7 shows the process of transferring a parameter in the parameter transferring process shown in FIG. 6;

FIG. 9 is a flowchart of the contents of the process according to the second example of the parameter transferring process performed by the MPU;

FIG. 10 shows the relationship between the operation performed on the magnetic disk and the change of the use condition of the magnetic head on the operation, and the necessary parameters required to perform the operation and make the change;

DESCRIPTION OF THE PREFERRED EMBODIMENTS

Figure 2:
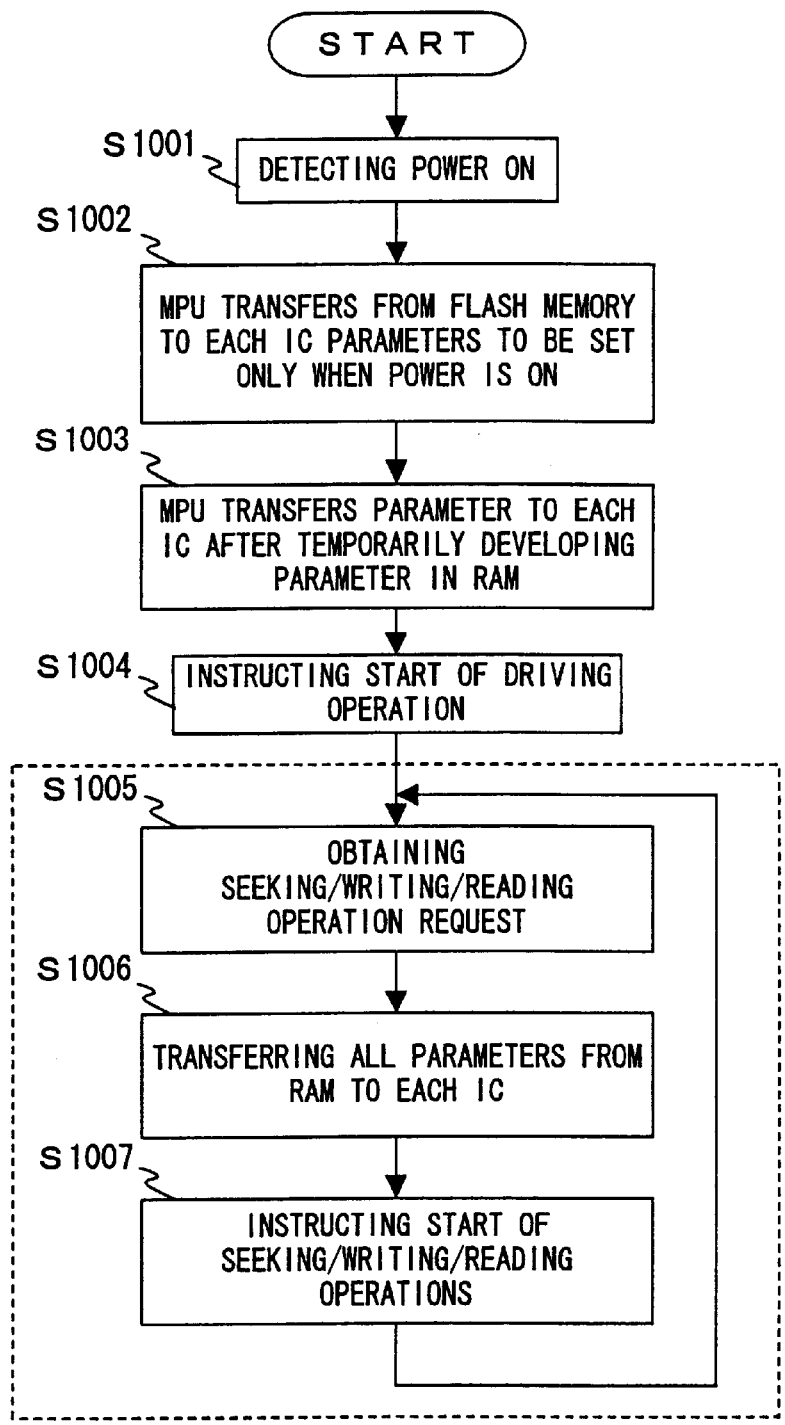
FIG. 2 is a flowchart of the contents of the conventionally performed parameter transferring process.
Figure 3:
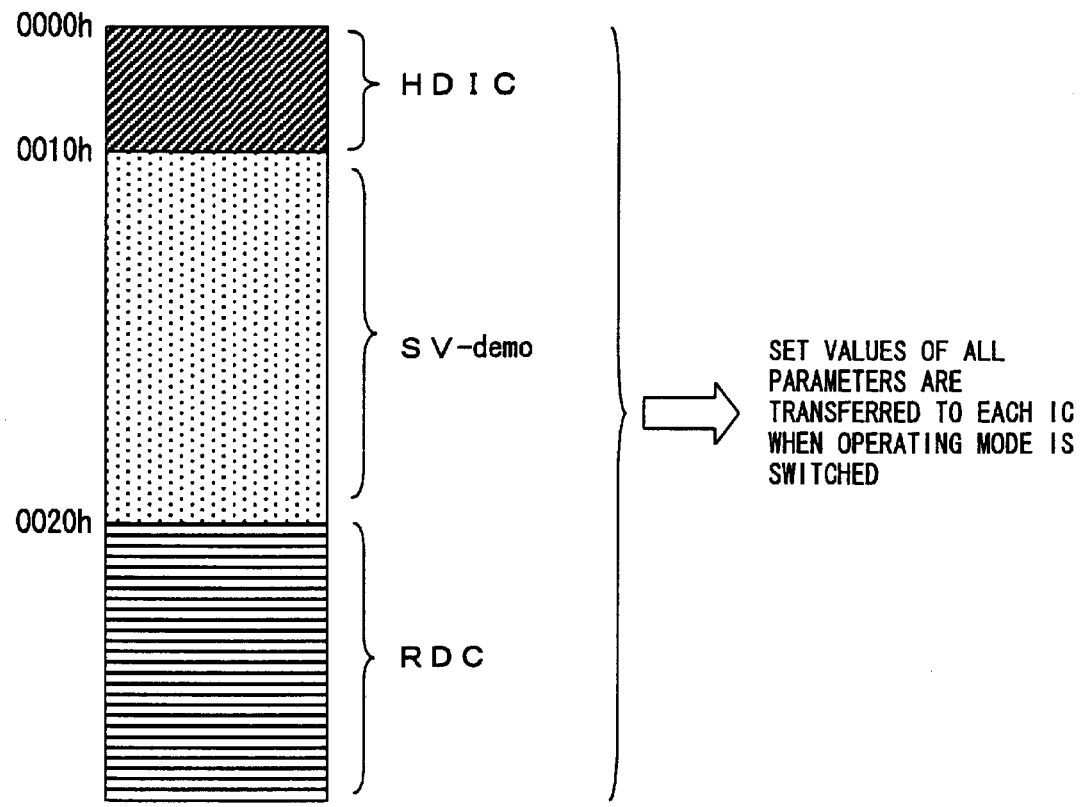
FIG. 3 shows an example of assigning the use of a storage area of the RAM.

An embodiment of the present invention is described below by referring to the attached drawings. In this embodiment, the present invention is applied to a magnetic disk storage device using a magnetic disk as a storage medium.

FIG. 4 shows the configuration of the magnetic disk storage device (hereinafter referred to simply as the present device) embodying the present invention.

A magnetic disk 1 is a storage medium storing data in the magnetic layer formed on the surface of a disk in the magnetic storage system. According to the present embodiment, there are a plurality of magnetic disks 1, and the ZBR is adopted for the data storage system on the magnetic disk 1.

An SPM 2 is a spindle motor, and rotates the magnetic disk 1.

A magnetic head 3 reads or write data from and to the magnetic disk 1, and is provided on either side of the magnetic disk 1.

A carriage 4 holds the magnetic head 3.

A VCM 5 is a voice coil motor, drives the carriage 4, and moves the magnetic head 3 between cylinders provided on the magnetic disk 1 (seeking operation).

An HDIC 6 is a head IC, and is used to control the operations of the magnetic head 3 which functions as a selector selecting a magnetic head from a plurality of magnetic heads 3, a preamplifier for amplifying a read signal, and a bias current source for the magnetic head 3 when data is read, and as a driver of the magnetic head 3 when data is written. The HDIC 6 is the same as the above mentioned IC, and corresponds to the head control unit for controlling the electric operation of the head.

An RDC 7 is an IC of a PRML lead channel, demodulates and decodes a data signal which is an analog signal transmitted from the HDIC 6 based on the PRML system when data is read, and converts the decoded digital data into a parallel signal. When data is written, the RDC 7 encodes and modulates data to be written, and transmits the analog data signal to the HDIC 6. The IC performs the data process as described above. The RDC 7 corresponds to the data conversion unit for converting data read from or written to the magnetic disk 1.

An SV-DEMO 8 is an IC of a servo demodulator, performs a signal process required to configure a servo for control the position of the magnetic head 3, and is similar to the IC described above. The SV-DEMO 8 and an SPM/VCM-DRIVER 9 described below correspond to the head position control unit for controlling the position of the magnetic head 3 on the magnetic disk 1.

The SPM/VCM-DRIVER 9 is an IC that controls the rotating operation of the magnetic disk 1 and the moving operation of the carriage 4 by controlling the power applied to the SPM 2 and the VCM 5 according to the control signal transmitted from the SV-DEMO 8 through an MPU 11.

An HDC 10 is a hard disk controller and an IC for transmitting and receiving various instructions and data to and from a system such as a computer, etc. which is the host of the present device, and obtains from the host an operation request to the present device. According to the present embodiment, an operation request from the host to the present device is limited in advance to the three requests, that is, seek, read, and write requests.

The MPU 11 is a microprocessor for controlling the entire magnetic disk storage device.

RAM 12 is random access memory functioning as work memory used when the MPU 11 performs a controlling process.

FLASH-MEMORY 13 is a so-called flash EEPROM, and stores a control program executed by the MPU 11, and characteristic data of the magnetic head 3.

The process is described by referring to FIG. 5. FIG. 5 is a table showing the relationship between the operation performed on the magnetic disk 1 and necessary parameters to be transferred as shown in (ii) in FIG. 1 and grouped for each operation. As shown in FIG. 5, parameters HS, IMR, SSLE, SSLD, SBT, SFC, and SFG are required to perform a seeking operation on the magnetic disk 1, parameters FIR, FC, Boost, and TBG are required to perform a reading operation, and parameters IW and TBG are required to perform a writing operation. When the reading or writing operation is performed, the seeking operation is required immediately before either of the operations. Therefore, the parameters used in the seeking operation are transmitted with the parameters used in the reading or writing operations to the respective ICs.

Figure 6:
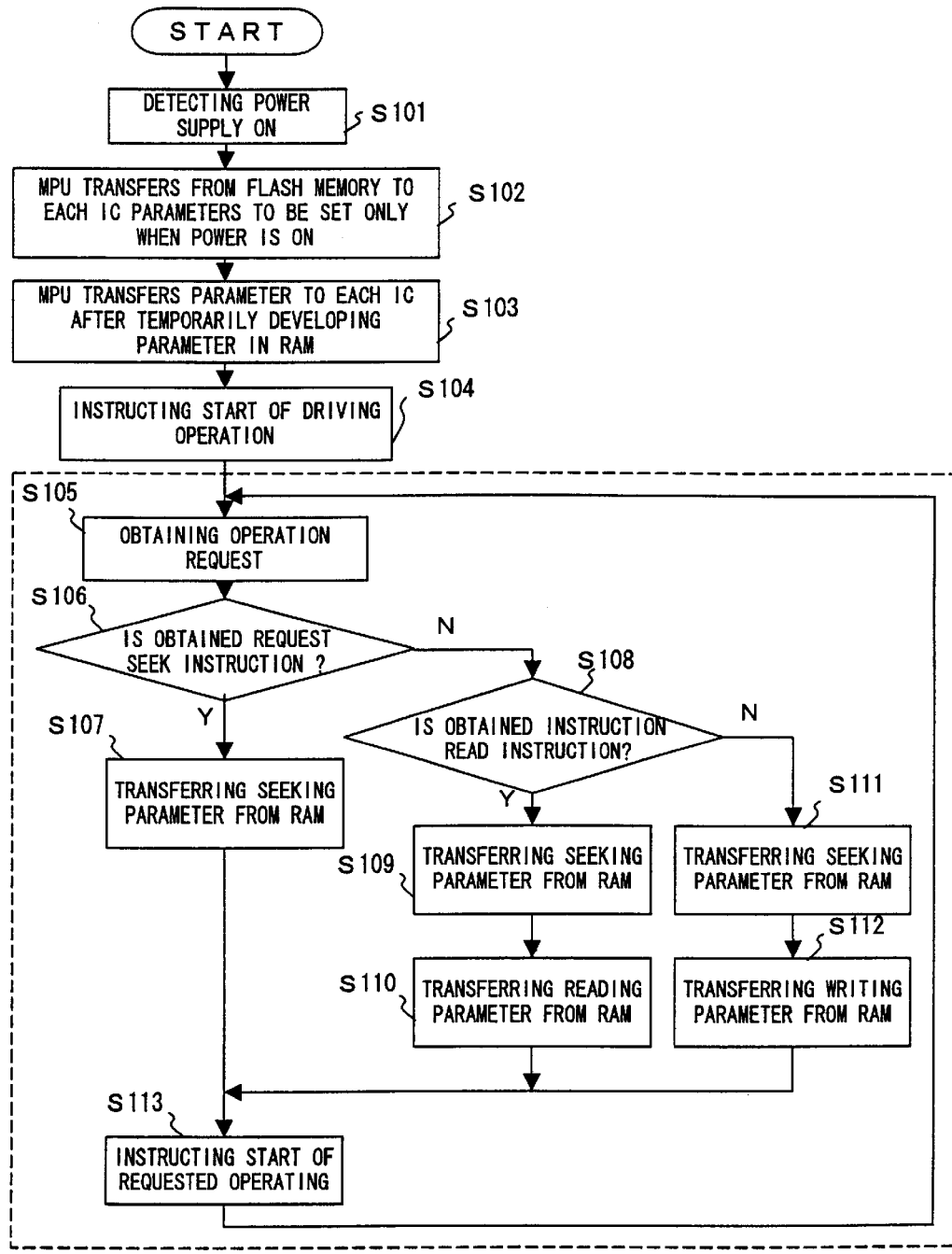
FIG. 6 is a flowchart of the contents of the process according to the first example of the parameter transferring process performed by the MPU.

Described below in detail is the process, which is performed by the MPU 11 shown in FIG. 4, of transferring a parameter to each of the ICs of the HDIC 6, the RDC 7, the SV-DEMO 8. FIG. 6 is a flowchart showing the first example of the contents of the parameter transferring process performed when the MPU 11 executes the control program of the entire device read from the FLASH-MEMORY 13.

In FIG. 6, in S101 through S104, the processes similar to those in S1001 through S1004 as shown in FIG. 2 are performed. That is, when the MPU 11 detects that the power has been applied to the present device (S101), it reads a set value of the parameter (shown in line (i) in FIG. 1) used for rewriting data only when the power is ON from the FLASH-MEMORY 13 storing the set values of transfer parameters in advance, and transfers the read value to a corresponding IC (S102). On the other hand, the MPU 11 reads from the FLASH-MEMORY 13 a parameter (shown in line (ii) in FIG. 1) to be transferred when an operation mode is switched, temporarily stores in the RAM 12, reads the initial set value of each parameter from the RAM 12, and transfers the value to a corresponding IC (S103). Then, the MPU 11 instructs each IC to start an operation (S104).

In S105, the MPU 11 obtains a request for a seeking, reading, or writing operation from a system such as the computer, etc. which is the host of the present device.

In S106, the MPU 11 checks the contents of an operation request obtained in the previous step, and determines whether or not the operation request refers to a seeking operation. If the determination result is YES, control is passed to S107. If it is NO, control is passed to S108.

In S107, the MPU 11 reads from the RAM 12 a set value of each of the necessary parameters for the seeking operation shown in FIG. 5, and transmits the read value to a corresponding IC for which the parameter is to be set. Then, control is passed to S113.

On the other hand, when the result of the determination process in the above mentioned S106 is NO, the MPU 11 checks again in S108 the contents of the operation request obtained in S105, and determines whether or not the operation request refers to a reading operation. If the determination result is YES, control is passed to S109. If it is NO, then control is passed to S111. If the determination in S108 is NO, then it is assumed that the contents of the operation request obtained in S105 refers to a writing operation.

In S109, the MPU 11 reads from the RAM 12 a set value of each of the necessary parameters for the seeking operation shown in FIG. 5, and transmits the read value to a corresponding IC for which the parameter is to be set. The process is the same as the above mentioned process in S107.

In S110, the MPU 11 reads from the RAM 12 a set value of each of the necessary parameters for the reading operation shown in FIG. 5, and transmits the read value to a corresponding IC for which the parameter is to be set. After this process, control is passed to S113.

When the result of the above mentioned determining process in S108 is NO, the MPU 11 reads from the RAM 12 the set value of each of the necessary parameters for the seeking operation shown in FIG. 5 in S111, and transfers the values to the IC for which the parameter is to be set. The process is the same as the above mentioned process in S107.

In S112, the MPU 11 reads from the RAM 12 a set value of each of the necessary parameters for the writing operation shown in FIG. 5, and transmits the read value to a corresponding IC for which the parameter is to be set.

In the processes in S106 through S112, all necessary parameters for the operation requests obtained in S105 have been completely transferred. Therefore, in S113, the MPU 11 instructs each IC to start an operation. After the process, control is returned to S105, and the above mentioned processes are repeatedly performed.

By the MPU 11 performing the above mentioned processes, the set value of each parameter is transferred to each of the corresponding ICs, and is then set. FIG. 7 shows the process of transferring a parameter, and the set value of the parameter stored in the FLASH-MEMORY 13 for each IC to be transferred when an operation mode is switched is temporarily stored in the RAM 12 in the process in S104 ((a) to (b)). Then, in the processes in S106 through S112, the set value of necessary parameter of each operation is selected based on the contents of the operation requested by the host, and is then transferred to a corresponding IC ((b) to (c)).

Figure 8:
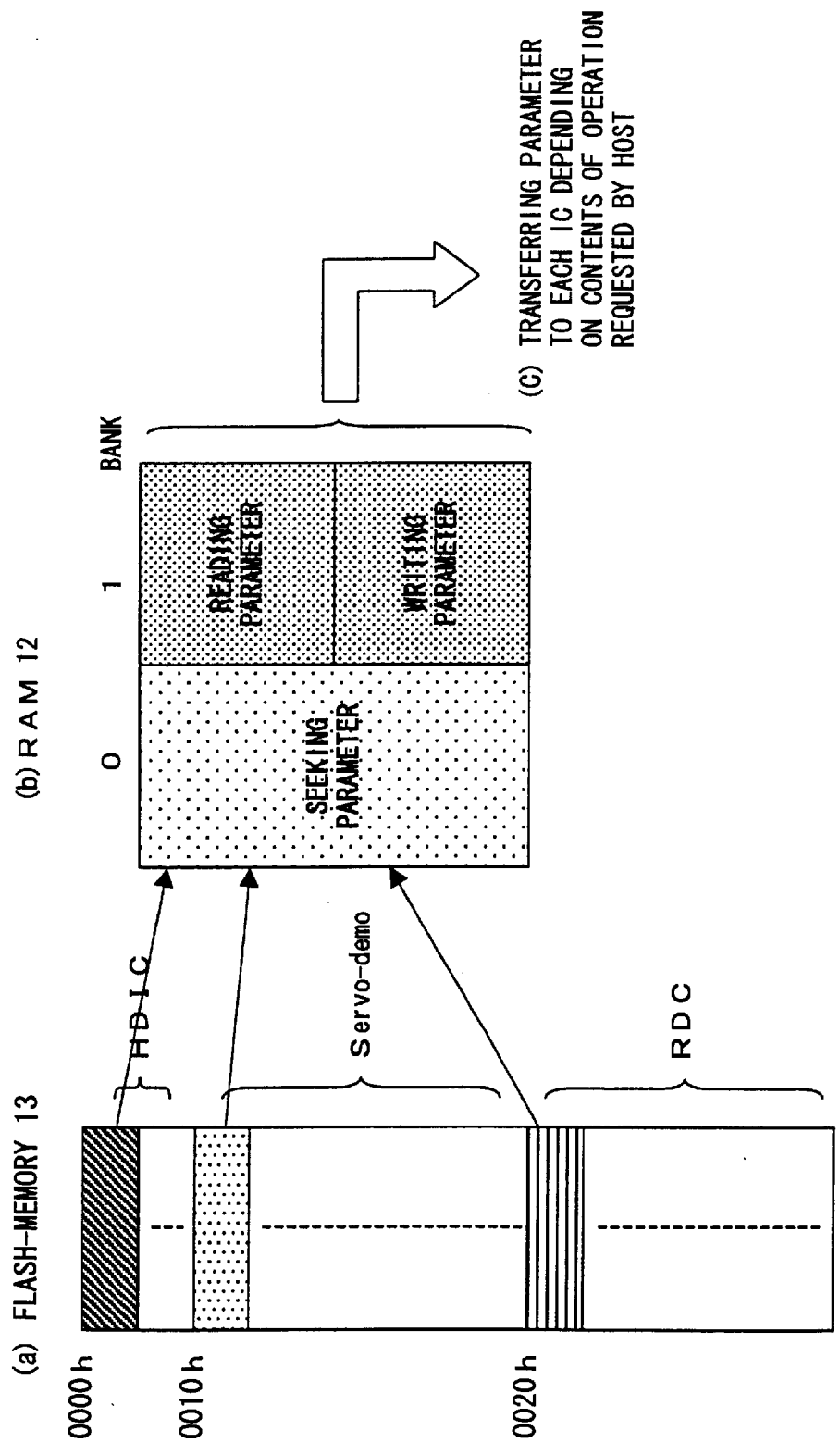
FIG. 8 shows each parameter stored in the RAM for each of the operation contents requiring the parameter.

In the process shown in FIG. 6, when a parameter to be transferred when an operation mode is switched is read from the FLASH-MEMORY 13 and stored in the RAM 12, parameters can be collectively stored for the seeking, reading, or writing operations. FIG. 8 shows an example of a method of storing each parameter in a storage area of the RAM 12 for the respective operation contents required by the parameter.

In FIG. 8, the RAM 12 comprises two bank areas, that is a bank 0 and a bank 1. These banks are set such that they can be logically in series in the storage area of the RAM 12. When a parameter value for each IC read from the FLASH-MEMORY 13 is stored in the RAM 12, the parameters required in a seeking operation are collectively stored in the bank 0 of the RAM 12, and the parameters required in reading and writing operations are separately stored in the bank 1 ((a) to (b)). Then, based on the contents of the operation requested by the host, the bank of the RAM 12 storing the necessary parameter for the operation requested by the host is selected based on the contents of the operation, and the parameter stored in the bank is transferred ((b) to (c)). When parameters required depending on the contents of an operation request are collectively stored in the areas at serial addresses in the RAM 12, the data accessing process repeatedly performed when a parameter value is read can be performed at a higher speed, thereby further improving the performance of the present device.

FIG. 9 is a flowchart of the second example of the contents of the parameter transferring process performed when the MPU 11 executes a control program for the entire device read from the FLASH-MEMORY 13. The process of the second example realizes the method of transferring a parameter described above by referring to FIG. 8.

In FIG. 9, the process similar to that in S101 through S104 as shown in FIG. 6 is performed in S201 through S204, but, unlike in S103, the MPU 11 collectively stores the parameters required in a seeking operation in the band 0 of the RAM 12 in S203 as shown in FIG. 8 when the parameters read from the FLASH-MEMORY 13 to be transferred when an operation mode is switched are stored in the RAM 12, and the parameters required in reading and writing operations separately in the bank 1.

In S205, the MPU 11 obtains a request for a seeking, reading, or writing operation from a system such as a computer, etc. which is the host of the present device.

In S206, the MPU 11 checks the contents of the operation request obtained in the previous step, and determines whether or not the operation request refers to a seeking operation. If the determination result is YES, then control is passed to S207. If it is NO, control is passed to S208.

In S207, the MPU 11 continuously reads data stored in the bank 0 of the RAM 12 in which the set value of each parameter required for a seeking operation is stored, and transfers the read data to each IC for which parameters are to be set. After the process, control is passed to S211.

When the result of the above mentioned determining process in S206 is NO, the MPU 11 checks again in S208 the contents of the operation request obtained in S205, and determined whether or not the operation request refers to a reading operation. If the determination result is YES, control is passed to S209. If it is NO, control is passed to S210.

In S209, the MPU 11 continuously reads all data stored in the bank 0 of the RAM 12 in which the set value of each parameter required for a seeking operation is stored, and data stored in the corresponding area in the bank 1 in which the set value of each parameter required for a reading operation is stored, and transfers the read data to each IC for which parameters are to be set. After the process, control is passed to S211.

If the result of the above mentioned determination process in S208 is NO, that is, if it is assumed that the contents of the operation request obtained in S205 refers to a writing operation, then the MPU 11 continuously reads in S210 all data stored in the bank 0 of the RAM 12 in which the set value of each parameter required for a seeking operation is stored, and data stored in the corresponding area in the bank 1 in which the set value of each parameter required for a writing operation is stored, and transfers the read data to each IC for which parameters are to be set.

In S211, the MPU 11 instructs each IC to start an operation, and then control is returned to S205. Afterwards, the above mentioned processes are repeated.

Described below is another example of the above mentioned parameter transferring process. In this example, when the MPU 11 obtains a request for a seeking, reading, or writing operation from the host of the present device, the MPU 11 checks the current use condition of the magnetic head 3, that is, the current selection condition and the current position of the magnetic head 3 on the magnetic disk 1. Then, the parameter required to allow the present device to perform the requested operation is selected and transferred with the contents of the requested operation depending on the current use condition of the magnetic head 3, thereby furthermore reducing the number of transferred parameters as compared with the above mentioned first and second examples, and shortening the response time of the present device.

Described below is the table as FIG. 10. FIG. 10 is a table of parameters listed in FIG. 5 and shows the relationship between the operations performed on the magnetic disk 1 and the change of the user condition of the magnetic head 3 made by the operations, and the parameters required to perform the operations and make the change.

In FIG. 10, a 'different head' means that a magnetic head other than the currently selected magnetic head 3 should be selected from among a plurality of magnetic heads 3 to perform an operation requested from the host. The 'same head' means that it is not necessary to change the currently selected magnetic head 3 to perform an operation requested from the host. A 'cylinder not moved' means that it is not necessary to change the current position of the cylinder on the magnetic disk 1 of the magnetic head 3 to perform an operation requested from the host. A 'cylinder moved' means that it is necessary to change the current position of the cylinder on the magnetic disk 1 of the magnetic head 3 to perform an operation requested from the host. The operation mode is shown for convenience when it is described later by referring to each line shown in FIG. 10.

In FIG. 10, unlike in FIG. 5, note that parameters for a seeking operation to be performed immediately before a reading operation or a writing operation is performed are contained in the columns of the parameters for the reading operation and the writing operation. Therefore, for example, when a transfer parameter in the reading operation shown in FIG. 10 is compared with the parameter shown in FIG. 5, a transfer parameter to be compared can be obtained by adding the transfer parameter for the seeking operation to the transfer parameter for the reading operation shown in FIG. 5.

When FIG. 10 is compared with FIG. 5 with the above mentioned points taken into account, the number of transfer parameters decreases in the operation modes (1), (2), (4), (5), (7), and (8) shown in FIG. 10. To perform an operation at a request from the host, when it is not necessary to change the current selection of the magnetic head 3 (when the operation modes are (2), (5), and (8)), it is not necessary to transfer the parameters HS, IMR, and IW for selecting the magnetic head 3 and controlling the electric operations of the selected head, and, to perform an operation at a request from the host, when it is not necessary to change the current position of the cylinder on the magnetic disk 1 of the magnetic head 3 (when the operation modes are (1), (4), and (7)), it is not necessary to transfer the parameters TBG and SFG used for setting the transfer frequency of data between the magnetic head 3 and the magnetic disk 1. Therefore, when the present device performs the above mentioned operations, the response time is furthermore shortened than in the parameter transferring process according to the first example.

Figure 11:
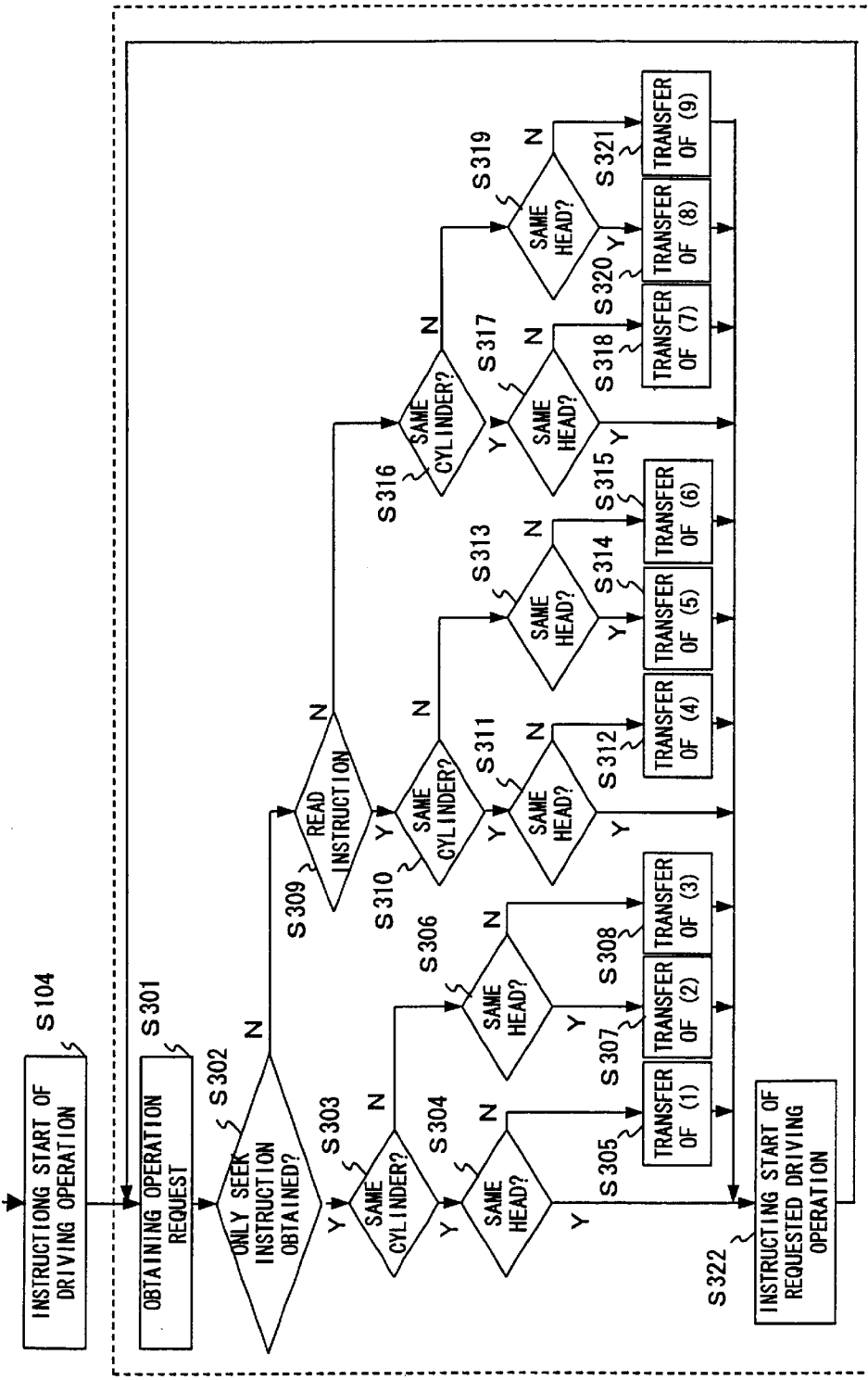
FIG. 11 is a flowchart of the contents of the process according to the third example of the parameter transferring process performed by the MPU.

FIG. 11 is a flowchart of the third example of the contents of the parameter transferring process performed when the control program for the entire device read by the MPU 11 from the FLASH-MEMORY 13 is executed. The third example of the program is to realize the transfer system for the above mentioned parameters. In FIG. 11, the processes in S101 through S104 immediately after the start of the processes, which are the same process steps as those in the first example shown in FIG. 6, are omitted.

In step S301 after S104, the MPU 11 obtains a request for the seeking, reading, or writing operation from the system such as a computer as the host of the present device, etc.

In step S302, the MPU 11 checks the contents of the operation request obtained in the previous step, and determines whether or not the operation request refers to a seeking operation. If the determination result is YES, then control is passed to S303. If it is NO, control is passed to S309.

In S303, the MPU 11 first checks the current position of the cylinder on the magnetic disk 1 of the magnetic head 3, and determines whether or not the cylinder of the magnetic disk 1 in which a seeking operation is requested is the same as the cylinder at the current cylinder position. If the determination result is YES, then control is passed to S304. If it is NO, control is passed to S306.

In S304, the MPU 11 checks which of the plurality of magnetic heads 3 is selected, and determines whether or not the magnetic head 3 to be selected at a seeking operation request is the same as the currently selected head. If the determination result is YES, then control is passed to S322. If it is No, then the set values of all transfer parameters in the operation mode (1) shown in FIG. 10 are read from the RAM 12 in S305, and are transferred to each of the ICs for which the parameters are to be set. Then, control is passed to S322.

If the determination result in S303 is NO, then the MPU 11 checks the current selection of the magnetic head 3 in S306 as in S304, and determines whether or not the magnetic head 3 to be selected at a seeking operation request is the same as the currently selected head. If the determination result is YES, then the set values of all transfer parameters in the operation mode (2) shown in FIG. 10 are read from the RAM 12 in S307, and are transferred to each of the ICs for which the parameters are to be set. Then, control is passed to S322. If the determination result is NO, then the set values of all transfer parameters in the operation mode (3) shown in FIG. 10 are read from the RAM 12 in S308, and are transferred to each of the ICs for which the parameters are to be set. Then, control is passed to S322.

If the determination result in S302 is NO, then, the MPU 11 checks in S309 the contents of the operation request obtained in S302, and determines whether or not the operation request refers to a reading operation. If the determination result is YES, then control is passed to S310. If the determination result is NO, then it is assumed that the contents of the operation request obtained in S302 refers to a writing operation, and control is passed to S316.

In S310, the MPU 11 checks the current position of the cylinder on the magnetic disk 1 of the magnetic head 3, and determines whether or not the cylinder of the magnetic disk 1 referred to by the reading operation is the same as the cylinder at the current cylinder position. If the determination result is YES, then control is passed to S311. If it is NO, then control is passed to S313.

In S311, as in S304, the MPU 11 checks the current selection of the magnetic head 3, and determines whether or not the magnetic head 3 to be selected at a reading operation request is the same as the currently selected head. If the determination result is YES, then control is passed to S322. If it is No, then the set values of all transfer parameters in the operation mode (4) shown in FIG. 10 are read from the RAM 12 in S312, and are transferred to each of the ICs for which the parameters are to be set. Then, control is passed to S322.

If the determination result in S310 is NO, then the MPU 11 checks the current selection of the magnetic head 3 in S313 as in S304, and determines whether or not the magnetic head 3 to be selected at a reading operation request is the same as the currently selected head. If the determination result is YES, then the set values of all transfer parameters in the operation mode (5) shown in FIG. 10 are read from the RAM 12 in S314, and are transferred to each of the ICs for which the parameters are to be set. Then, control is passed to S322. If the determination result is NO, then the set values of all transfer parameters in the operation mode (6) shown in FIG. 10 are read from the RAM 12 in S315, and are transferred to each of the ICs for which the parameters are to be set. Then, control is passed to S322.

In S316, the MPU 11 first checks the current position of the cylinder on the magnetic disk 1 of the magnetic head 3, and determines whether or not the cylinder of the magnetic disk 1 in which a writing operation is requested is the same as the cylinder at the current cylinder position. If the determination result is YES, then control is passed to S317. If it is NO, control is passed to S319.

The MPU 11 checks the current selection of the magnetic head 3 in S317 as in S304, and determines whether or not the magnetic head 3 to be selected at a writing operation request is the same as the currently selected head. If the determination result is YES, control is passed to S322. If the determination result is NO, then the set values of all transfer parameters in the operation mode (7) shown in FIG. 10 are read from the RAM 12 in S318, and are transferred to each of the ICs for which the parameters are to be set. Then, control is passed to S322.

If the determination result in S316 is NO, then, the MPU 11 checks the current selection of the magnetic head 3 in S319 as in S304, and determines whether or not the magnetic head 3 to be selected at a writing operation request is the same as the currently selected head. If the determination result is YES, then the set values of all transfer parameters in the operation mode (8) shown in FIG. 10 are read from the RAM 12 in S320, and are transferred to each of the ICs for which the parameters are to be set. Then, control is passed to S322. If the determination result is NO, then the set values of all transfer parameters in the operation mode (9) shown in FIG. 10 are read from the RAM 12 in S321, and are transferred to each of the ICs for which the parameters are to be set.

Since parameters required to perform an operation at a request obtained in S301 are completely transferred in the processes in S302 through S321, the MPU 11 issues an instruction to start the operation to each IC in S322. After the process, control is returned to S301, and the above mentioned processes are repeated.

The set value of each parameter used for performing a process corresponding to a request from a host is correctly transferred to a corresponding IC and then set by the MPU 11 performing the above mentioned processes.

According to the present embodiment, a control program for the entire device for allowing the MPU 11 to perform the above mentioned parameter transferring processes is stored in the FLASH-MEMORY 13 in advance. However, the present invention can also be realized by storing the program in advance in another storage medium readable by a computer which is the hose of the present device, temporarily storing in the FLASH-MEMORY 13 (or the RAM 12) the program read by the host from the storage medium, and then by reading and executing the program by the MPU 11.

Figure 12:
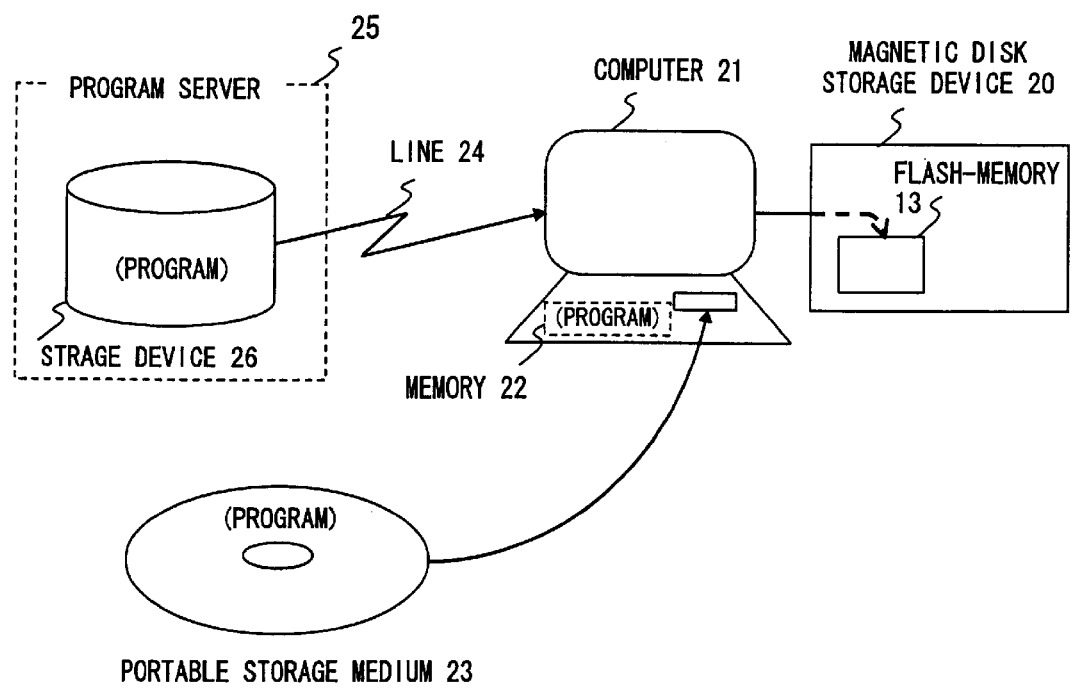
FIG. 12 shows an example of a computer-readable storage medium storing a program.

FIG. 12 shows an example of a computer-readable storage medium storing a program executed by the MPU 11 with the above mentioned configuration of the system, The storage medium can be, for example, semiconductor memory built in the body of a computer 21 which is the host of a present device 20 comprising the FLASH-MEMORY 13 or externally provided, memory 22 such as an external storage device, etc., a portable storage medium 23 such as CD-ROM, DVD-ROM, an MO (magneto-optical disk), a floppy disk, etc.

A storage medium can also be a storage device 26 provided in a program server 25 which is a computer connected to the computer 21 through a line 24. In this case, a transmission signal obtained by modulating a carrier wave using a data signal representing a control program is transmitted from the program server 25 through the line 24 which is a transmission medium, and a received transmission signal is demodulated by the computer 21 to regenerate the control program, thereby executing the control program.

The present invention is configured such that, as described above in detail, when a parameter used for controlling the operation of a disk storage device which seeks a head, reads data, or performs a writing operation using a disk-shaped storage medium, a set value of the parameter whose setting has to be changed to obtain a request for the operation, determine the contents of the request, and control the parameters to satisfy the operation request based on the determination result can be transferred.

With the configuration, depending on the contents of an operation request issued from a host, only the set value of the minimal parameter to control the operation to satisfy the contents of the request can be transferred, and the set value of an unnecessary parameter can be suppressed from being transferred. Therefore, the response time to the host can be shortened for an operation request.

What is claimed is:

1. A disk storage device which performs operations to seek data from, to read data from, and to write data to a disk-shaped storage medium using a head, comprising:

an obtaining unit obtaining a request for the operation;

a determination unit determining contents of the request; and a transfer unit transferring a set value of a parameter whose setting is to be changed to control parameters used for controlling the operation based on a determination result;

wherein depending on the contents of the operation request issued, only the set value of a minimal parameter is transferred to control the operation such that the contents of request can be satisfied, and the set value of a parameter unnecessary to control the operation is prevented from being transferred.

2. The device according to claim 1, wherein said storage medium is a magnetic disk.

3. The device according to claim 1, further comprising:

one or more heads used for reading data from and writing data to the storage medium;

a head control unit controlling an electric operation of said heads;

a data conversion unit converting a signal of the data read from or written to the storage medium; and a head position control unit controlling a position of said head on the storage medium, wherein said transfer unit transfers the set value of the parameter to at least one of said head control unit, said data conversion unit, and said head position control unit.

4. The device according to claim 3, wherein:

said set value of a parameter transferred to said head control unit contains at least one of a set value of a parameter used for selecting said head, a set value of a parameter used for setting a bias current for allowing said head to read data, and a set value of a parameter used for setting a drive current for allowing said head to write data; and said set value of a parameter transferred to said data conversion unit and said head position control unit contains at least one of a set value of a parameter setting a characteristic of a filter, and a set value of a parameter setting a transfer frequency of data between said head and said storage medium.

5. The device according to claim 1, further comprising memory, whose storage area comprises a plurality of banks, storing a set value of the parameter divided and stored in each bank corresponding to contents of the request for the operation, wherein said transfer unit reads the set value of the parameter from the memory and transfers the value.

6. The device according to claim 1, further comprising:

a plurality of heads reading data from and writing data to the storage medium, wherein said transfer unit does not transfer a set value of a parameter for controlling head selection when a selected head does not have to be changed to control the operation.

7. The device according to claim 1, further comprising:

a head reading data from and writing data to the storage medium storing information, wherein said transfer unit does not transfer a parameter setting a transfer frequency of data between said head and the storage medium when a position of said head on the storage medium does not have to be changed to control the operation.

8. A disk storage device which performs operations to seek data from, to read data from, and to write data to a disk-shaped storage medium using a head, comprising:

obtaining means for obtaining a request for the operation;

determination means for determining contents of the request; and transfer means for transferring a set value of a parameter whose setting is to be changed to control parameters used for controlling the operation based on a determination result;

wherein depending on the contents of the operation request issued, only the set value of a minimal parameter is transferred to control the operation such that the contents of the request can be satisfied, and the set value of a parameter unnecessary to control the operation is prevented from being transferred.

9. A method for transferring a parameter used for controlling an operation of a disk storage device which performs operations to seek data from, to read data from, and to write data to a disk-shaped storage medium using a head, comprising:

obtaining a request for the operation;

determining contents of the request; and transferring a set value of a parameter whose setting is to be changed to control parameters used for controlling the operation based on a determination result;

wherein depending on the contents of the operation request issued, only the set value of a minimal parameter is transferred to control the operation such that the contents of the request can be satisfied, and the set value of a parameter unnecessary to control the operation is prevented from being transferred.

10. A computer-readable storage medium storing a computer program used to direct a computer to control a transfer of a parameter used for controlling an operation of a disk storage device which performs operations to seek data from, to read data from, and to write data to a disk-shaped storage medium using a head, comprising:

obtaining a request for the operation;

determining contents of the request; and transferring a set value of a parameter whose setting is to be changed to control parameters used for controlling the operation based on a determination result;

wherein depending on the contents of the operation request issued, only the set value of a minimal parameter is transferred to control the operation such that the contents of the request can be satisfied, and the set value of a parameter unnecessary to control the operation is prevented from being transferred.

11. A computer program embodied on a transmission medium used to direct a computer to control a transfer of a parameter used for controlling an operation of a disk storage device which performs operations to seek data from, to read data from, and to write data to a disk-shaped storage medium using a head, comprising:

obtaining a request for the operation;

determining contents of the request; and transferring a set value of a parameter whose setting is to be changed to control parameters used for controlling the operation based on a determination result;

wherein depending on the contents of the operation request issued, only the set value of a minimal parameter is transferred to control the operation such that the contents of the request can be satisfied, and the set value of a parameter unnecessary to control the operation is prevented from being transferred.

12. A computer data signal embodied in a carrier wave storing a computer program used to direct a computer to control a transfer of a parameter used for controlling an operation of a disk storage device which performs operations to seek data from, to read data from, and to write data to a disk-shaped storage medium using a head, comprising:

obtaining a request for the operation;

determining contents of the request; and transferring a set value of a parameter whose setting is to be changed to control parameters used for controlling the operation based on a determination result;

wherein depending on the contents of the operation request issued, only the set value of a minimal parameter is transferred to control the operation such that the contents of the request can be satisfied, and the set value of a parameter unnecessary to control the operation is prevented from being transferred.

* * * * *